United States Patent [19]

Eguchi et al.

[11] Patent Number: 4,843,601

[45] Date of Patent: Jun. 27, 1989

[54] TRACKING SERVO SYSTEM FOR OPTICAL DISK PLAYER APPARATUS

[75] Inventors: Naoya Eguchi, Tokyo; Norio Nishida, Kanagawa, both of Japan

[73] Assignee: Sony Corporation, Tokyo, Japan

[21] Appl. No.: 131,574

[22] Filed: Dec. 11, 1987

[30] Foreign Application Priority Data

Dec. 15, 1986 [JP] Japan .................................. 61-296644

[51] Int. Cl.⁴ .............................................. G11B 7/00
[52] U.S. Cl. .......................................... 369/44; 369/32
[58] Field of Search ....................... 369/32, 44, 45, 46, 369/275, 109, 110; 250/201 DF, 202

[56] References Cited

U.S. PATENT DOCUMENTS

| | | | |
|---|---|---|---|
| 4,430,870 | 2/1984 | Winter et al. | 66/210 |
| 4,467,462 | 8/1984 | Shibata | 369/44 |
| 4,494,226 | 1/1985 | Hazel et al. | 369/44 |
| 4,539,665 | 9/1985 | Iso et al. | 369/44 |
| 4,544,838 | 10/1985 | Musha et al. | 369/44 |
| 4,553,228 | 11/1985 | Gerard et al. | 369/46 |
| 4,562,564 | 12/1985 | Bricot et al. | 369/32 |
| 4,564,929 | 1/1986 | Yonezawa et al. | 369/46 |
| 4,613,963 | 9/1986 | Hirano | 369/44 |
| 4,616,354 | 10/1986 | Yoshida | 369/44 |
| 4,674,081 | 6/1987 | Gerard et al. | 369/46 |
| 4,698,795 | 10/1987 | Yoshio | 369/44 |
| 4,740,939 | 4/1988 | Kimura et al. | 369/44 |
| 4,748,609 | 5/1988 | Yonezawa et al. | 369/44 |
| 4,779,251 | 10/1988 | Burroughs | 369/46 |

Primary Examiner—Donald McElheny, Jr.
Attorney, Agent, or Firm—Ronald P. Kananen

[57] ABSTRACT

A tracking servo system in a recordable optical disk player apparatus utilizes clock signals to be produced by irradiating laser beam to clock pits in servo areas as a reference signal for on-track adjustment. Based on the clock signal, polarity of a tracking error signal is detected for selectively opening and closing servo loop of the tracking servo system. CLOSED LOOP on-track adjustment will be performed while a laser beam spot is in a range where the tracking error indicative value is gradually reduced according to decreasing of the distance of the laser beam spot to the track center. On the other hand, OPEN LOOP on-track adjustment will be performed while the laser beam spot is in a range where the tracking error indicative value is increased according to decreasing of the distance between the laser beam spot and the track center. Since the polarity of the tracking error signal may indicate the range of the laser beam spot position, selection of the CLOSED LOOP and OPEN LOOP can be made without requiring the signal to be reproduced from the data area.

13 Claims, 3 Drawing Sheets

TRACKING SERVO SYSTEM FOR OPTICAL DISK PLAYER APPARATUS:

BACKGROUND OF THE INVENTION

1. Field of the Invention

The present invention relates generally to a tracking servo system for an optical disk player appartus. More specifically, the invention relates to a tracking servo system which is particularly adapted for quick tracking by detecting warding pit in a servo area formed on an optical disk.

2. Description of the Prior Art

Known optical disks for high density recording of audio signals and/or video signals are designed to be formed with a plurality of data pits for recording audio and/or video data in digital fashion. In such optical disks, the data pits are formed by digging pits with an energy beam, such as an optical laser beam. Such optical disks are designed only for reproduction and not for recording. In order to make such optical disks more useful, an optical disk which allows both recording and reproduction of data has been developed. Such type of optical disk which allows both recording and reproduction of data will be hereafter referred to as a recordable optical disk.

The general idea of the recordable optical disk and the task of the invention will be discussed to facilitate a better understanding of the present invention, with reference to FIGS. 1 to 4, in which:

FIG. 1 is a general plan view of a recordable optical disk;

FIG. 2 is an enlarged illustration showing the structure of a recording track to be formed on the recordable optical disk;

FIG. 3 is a further enlarged illustration of pits in a servo area on the tracks of the recordable optical disk; and FIG. 4 is a chart showing a waveform of a tracking error signal.

As shown in FIG. 1, the recordable optical disk is formed with a vertical magnetizing layer on the recording surface, which vertical magnetizing layer can be magnetized by an optomagnetic process. On this recordable optical disk, recording tracks are formed in a form shown in FIG. 2. In each of the recording tracks are servo areas for tracking with regular intervals. In each servo area, three depressed pits 2A, 2B and 3 are formed by an embossing process, for example. The depth of each depressed pit 2A, 2B and 3 substantially corresponds to $\lambda 4$ to $\lambda 8$ where $\lambda$ is a wavelength of a laser beam. As clearly shown in FIG. 3 the depressed pits 2A and 2B are respectively offset from the track center. The offset magnitude of the depressed pits 2A and 2B is respectively ¼ of the distance Q between adjacent tracks. These depressed pits 2A and 2B will be hereafter referred to as servo pits. On the other hand, the depressed pit 3 is formed on the track center and is distanced from the servo pit 2B at a predetermined distance L. The signal reproduced from this depressed pit 3 serves as a reference clock of data. Therefore, this depressed pit 3 will be hereafter referred to as a "clock pit".

As seen from FIGS. 2 and 3, the servo pits 2A and 2B and the clock pits 3 on the respective recording tracks are oriented in radial alignment with each other. Namely, each of the servo pits 2A and 2B and the clock pit 3 are oriented at the same angular position to that of the adjacent tracks. The servo pits 2A and 2B and the clock pit 3 form one servo area.

Between adjacent servo areas, data recording areas 4 are formed on the track. For example, as shown in FIG. 2, the data recording area 4 is formed between the servo area where the servo pits 2A and 2B and the clock pit 3 are formed, and the servo area where the servo pits 2A' and 2B' and the clock pit 3' are formed.

Upon recording and reproduction of the data, a laser beam is irradiated onto the servo pits 2A and 2B and the clock pit 3 to reproduce tracking error signals and reference clock signals based on the reflected light beam. Furthermore, on the basis of the reflected light beam from a mirror portion L between the pits 2B and 3, a focus error signal is established.

The tracking error signal level is variable depending uon the position of the laser beam spot 5 relative to the track. The relationship between the tracking error signal and the laser beam spot position is shown in FIG. 3. As will be appreciated from FIG. 3, when the irradiation point of the laser beam spot moves in a direction shown by the arrow, the laser beam spot position tends to vary as shown in A, B and C of FIG. 3. Depending upon the laser beam spot position, the tracking error signal level tends to vary as shown in the curves a, b and c of FIG. 3, depending upon the relative position of the laser beam spot 5 and the servo pits 2A and 2B.

In the case of track A of FIG. 3, the laser beam spot 5 is precisely in an on-track position. Therefore, the tracking error signal level drops at substantially the same magnitude at each of the positions of the servo pits 2A and 2B because of substantially even reflected light intensity, as shown in curve a of FIG. 3. On the other hand, in the case of track B, since the laser beam spot 5 is offset from the track center toward the side where the servo pit 2A is formed, the signal level drop at the position of the servo pit 2A becomes much greater than that at the servo pit 2B due to difference of the reflected light intensity, which difference is caused by the difference between the irradiated pit areas, as shown in b of FIG. 3. Similarly, in the case of track C, since the laser beam spot 5 is offset from the track center toward the side where the servo pit 2B is formed, the signal level drop at the position of the servo pit 2B becomes much greater than that at the servo pit 2A, as shown in curve c of FIG. 3.

Therefore, by sampling the reflected light intensity Sa at the timing of $T_1$ where the laser beam irradiates the servo pit 2A and the reflected light intensity Sb at the timing of $T_2$ where the laser beam irradiates the servo pit 2B, and by deriving the difference between the reflected light intensities at $T_1$ and $T_2$, the offset magnitude of the laser beam spot relative to the track center can be obtained. The signal indicative of the difference between Sa and Sb serves as the tracking error signal. In the tracking servo system, the laser beam spot position is controlled so as to reduce the tracking error indicative value (Sa - Sb) toward zero so that the laser beam spot can be located at the on-track position. Such tracking servo systems have been disclosed in the U.S. Pat. Nos. 4,553,228 and 4,430,870.

On the other hand, as is well known, the tracking servo system of the optical disk player apparatus also peforms seek or track-access action for locating the laser beam spot on a desired one of a plurality of tracks by jumping tracks in a radial direction. Namely, as is well known, in the seek action, the laser beam spot position is shifted radially to be located on the desired track. This seek action takes place by driving a laser head in a radial direction by an acceleration pulse and a subsequent deceleration pulse. By the acceleration pulse, the laser head is driven in the radial direction toward the desired track. Subsequently, the deceleration pulse is generated to stop the laser head at the desired track. However, due to an inertia moment exerted on the laser head, it is difficult to stop the laser head at the desired position, at which the laser beam spot is located at the on-track position. Therefore, subsequent to the seek action, it becomes necessary to adjust the laser beam spot position to be located at the on-track position. This action will be hereafter referred to as "on-track adjustment". This necessarily prolongs seek time.

Further details of the seek action and subsequent on-track adjustment will be discussed herebelow.

Assuming the radial position of the laser beam spot 5 is v and the pitch of the tracks in the radial direction is Q, and further assuming that the laser beam spot 5 is located at the on-track position at the position v, the tracking error signal $e_t = Sa - Sb = 0$. On the other hand, when the laser beam spot 5 is offset from the track center, the value $e_t$ of the tracking error signal can be illustrated by a sine coefficient as follows:

$$e_t = -k \sin(2\pi v/Q)$$

where $k$ is a constant.

According to the laser beam spot position, the tracking error signal value varies substantialy along the sine curve as shown in FIG. 4, in a stepwise fashion with a stepping magnitude of k.

During seek or traversing actions, when the laser beam spot is located at a position offset from the track center in a magnitude of Q/2, the laser beam spot irradiates the outer servo pit 2A of one track and the inner servo pit 2B of the next track. In this case, the irradiation area at the servo spot 2A and 2B becomes even and thus the tracking error indicative value becomes zero (0).

Therefore, in the operation in which the laser beam spot is shifted in a radial direction for track-jump action or so forth, the track error signal level in a range F of FIG. 4 becomes smaller toward zero as the laser beam spot approaches the track center. On the other hand, while the laser beam spot is in a range of N of FIG. 4, the tracking error signal $e_t$ increases as the laser beam spot approaches the track center. This necessarily prolongs the period necessary for on-track adjustment.

In order to solve this problem, the conventional optical disk player apparatus, such as that disclosed in the Japanese Patent Second (examined) Publication (Tokko) Showa 59-8893, uses an RF signal to be reproduced during reproduction for on-tracking adjustment. In the practical on-track adjustment action, the phase of the level variation of the RF signal which is caused when the laser beam spot offsets from the track center is compared with the phase of the tracking error signal for extracting the deceleration or braking signal.

This method is effective for shortening on-track adjustment time. However, such a process is possible when the transverse action and subsequent on-track adjustment action takes place in playback only on an optical disk, such as compact disks, video disks and so forth, since the RF signal can be reproduced. However, since the recordable optical disk has no RF data recording pit, this process is not applicable for the recordable optical disk.

SUMMARY OF THE INVENTION

Therefore, it is a principle object of the present invention to provide a tracking servo system of an optical disk player apparatus adapted for recording and reproducing data on a recordable optical disk, which tracking servo system can shorten the period necessary for on-track adjustment after a traversing action.

Another object of the invention is to provide a tracking servo system which is capable of quick on-track adjustment without requiring a reproduced signal, such as an RF signal In order to accomplish the aforementioned and other objects, a tracking servo system in a recordable optical disk player apparatus, according to the present invention, utilizes clock signals to be produced by irradiating a laser beam on clock pits in servo areas as a reference signal for on-track adjustment. Based on the clock signals, the polarity of a tracking error signal is detected for selectively opening and closing a servo loop of the tracking servo system.

According to the present invention set forth above, a CLOSED LOOP on-track adjustment is performed when a laser beam spot is in a range where the tracking error indicative value is gradually reduced according to a decrease in the distance of the laser beam spot to the track center. On the other hand, an OPEN LOOP on-track adjustment is performed while the laser beam spot is in a range where the tracking error indicative value increases according to a decrease in the distance between the laser beam spot and the track center. Since the polarity of the tracking error signal may indicate the range of the laser beam spot position, a selection of the CLOSED LOOP and OPEN LOOP can be made without requiring the signal to be reproduced from the data area.

According to one aspect of the invention, a tracking servo system for an optical disk player for reproducing and/or recording data on a plurality of coaxially-formed recording tracks on an optical disk which has a pair of servo pits and a clock pit on each of the recording tracks, the pair of servo pits being circumferentially-spaced at a known distance and radially offset from a track center of the associated recording track so as to be placed at opposite sides of the track center at a known distance, comprises a laser beam generator means for irradiating a laser beam onto the optical disk for scanning the recording tracks; a laser beam driving means for causing a shifting of the irradiating point of the laser beam in the radial direction; a tracking servo circuit means for controlling the laser beam driving means, the tracking servo circuit means being operable for operating the laser beam driving means to cause radial shifting of the laser beam irradiating point and operable in a feedback manner for adjusting the laser beam irradiating point on the center of the recording track; a light receiving means for receiving a light beam reflected from the laser beam irradiating point and producing a light intensity indicative signal; a first signal processing means for receiving the light intensity indicative signals respectively representative of the light intensity of the light beam reflected from the respective servo pits for deriving a tracking error signal based on the light intensity indicative signal values; a second signal processing means for receiving the light intensity indicative signal representative of the light intensity of the light beam reflected from the clock pit, detecting a shifting direction of the laser beam irradiating points in a radial direction, and producing a state indicative signal indicative of the shifting state of the laser beam irradiating point shifting away from the track center and approaching the track center; and third signal processing means for receiving the track error signal to detect zero-closing of the track error signal value for producing a zero-closing indicative signal and deriving a servo control signal for enabling and disabling the feedback mode tracking servo control of the tracking servo circuit means based on the state indicative signal and the zero-closing indicative signal.

According to another aspect of the invention, a tracking srvo system for an optical disk player for reproducing and/or recording data on a plurality of coaxially-formed recording tracks on an optical disk which has first and second servo pits and a clock pit in each servo area of each of the recording tracks, the first and second servo pits being arranged at known circumferentially-spaced positions at a known distance and radially offset from a track center of the associated recording track so as to be placed at opposite sides of the track center at a known distance, comprises a laser beam generator means for irradiating a laser beam onto the optical disk for scanning the recording tracks; a laser beam driving means for causing a shift of an irradiating point of the laser beam in the radial direction; a tracking servo circuit means, operable in a CLOSED LOOP mode and an OPEN LOOP mode, for controlling the laser beam driving means, the tracking servo circuit means being operable for operating the laser beam driving means to cause a radial shifting of the laser beam irradiating point and to adjust the laser beam irradiating point on the center of the recording track in the CLOSED LOOP mode; a tracking error signal generating means for deriving a tracking error signal on the basis of a difference of light intensity of a reflected light beam reflected from the first and second servo pits; a shifting state detector means monitoring a relative position between the recording tracks and the laser beam irradiating point for discriminating a shifting state between a first state, in which the laser beam irradiating point shifts away from the track center, and a second state, in which the laser beam irradiating point approaches toward the track center, and producing a state indicative signal; and a mode selector means for receiving the track error signal to detect a zero-closing of the track error signal value for producing a zero-closing indicative signal and deriving a mode selector signal for selectively operating the tracking servo circuit means in one of the CLOSED LOOP mode and the OPEN LOOP mode, based on the state indicative signal and the zero-closing indicative signal.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment but are for explanation and understanding only.

In the drawings.

DESCRIPTION OF THE PREFERRED EMBODIMENT

Figure 5:
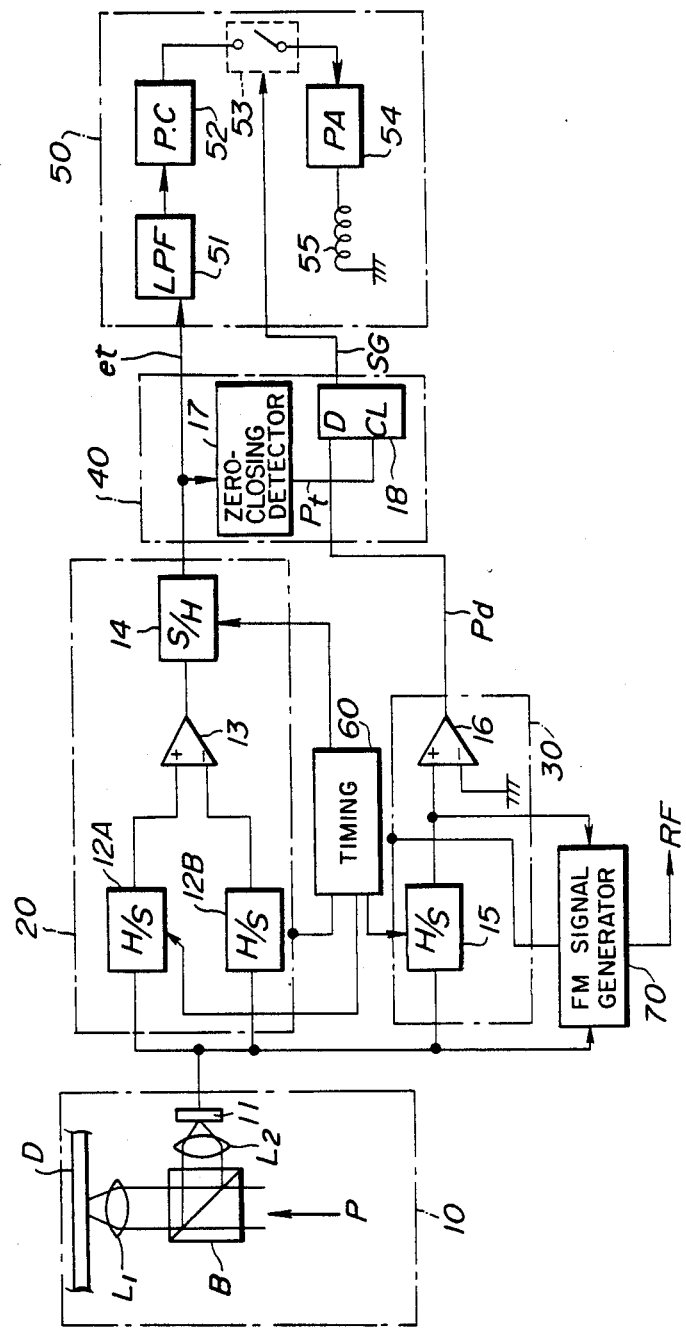
FIG. 5 is a circuit diagram of the preferred embodiment of a tracking servo system, according to the present invention.

The preferred embodiment of a tracking servo system, according to the present invention, will be discussed herebelow with reference to FIGS. 5 and 6. FIG. 5 shows a block diagram of the preferred embodiment of the tracking servo system, which includes an optical system 10 for irradiating a laser beam P onto an optical disk D.

The laser beam P is generated by a laser beam generator (not shown). The laser beam P is irradiated onto the recording surface of the optical disk D via a beam splitter B and an object lens $L_1$. The laser beam irradiated on the recording surface of the optical disk D is reflected and received by a light-receiving element 11 via the beam splitter B and a convergence lens $L_2$. As seen from FIG. 5, the light-receiving element 11 and the convergence lens $L_2$ are arranged in alignment with each other along an axis extending substantially perpendicular to an axis along which the laser beam is irradiated onto the recording surface of the optical disk D. Therefore, the reflected light beam passing the beam splitter B is deflected at about a right angle to be directed toward the light-receiving element 11.

The light-receiving element 11 produces an electric signal representative of the data indicated by the reflected light received. The electric signal output from the light-receiving element 11 is fed to first and second signal processing circuits 20 and 30.

The first signal processing circuit 20 has first and second sample/hold circuits 12A and 12B. The first and second sample/hold circuits 12A and 12B are connected to a timing control circuit 60 which outputs timing control signals for controlling the sample/hold timing. In order to control the sample timing, the timing control circuit 60 outputs a timing control signal $T_1$ at a timing corresponding to the laser beam scanning timing of the servo pit 2A to trigger a sampling and holding operation of the first sample hold circuit 12A. Similarly, the timing control circuit 60 outputs the timing control signal $T_2$ at a timing corresponding to the laser beam scanning timing of the servo pit 2B to trigger a sampling and holding operation of the second sample/hold circuit 12B. Therefore, the first and second sample/hold circuits 12A and 12B become active for sampling the electric signal from the light receiving element 11 at respective timings of the timing control signals $T_1$ and $T_2$. Namely, the sample/hold circuits 12A and 12B are adapted to sample the electric signals representative of the reflected light intensity at the servo pits 2A and 2B and output held value indicative output signals. The first signal processing circuit 20 includes a subtractor circuit 13 which receives the output signals of both sample/hold circuits 12A and 12B. The subtractor circuit 13, in the shown embodiment, comprises a differential amplifier connected to the sample/hold circuit 12A at its non-inverting input terminal and to the sample/- hold circuit 12B at its inverting input terminal. The subtractor circuit 13 derives the difference between the output signals of the sample/hold circuits 12A and 12B to output a difference indicative signal. The first signal processing circuit 20 further includes a third sample/-hold circuit 14. The third sample/hold circuit 14 is connected to the timing control circuit 60 to receive therefrom a timing control signal $T_3$ which is output at a timing corresponding to laser beam scanning timing of the clock pit 3. The third sample/hold circuit 14 samples and holds the difference indicative signal in response to the timing control signal $T_3$. The sample/hold circuit 14 outputs the held difference indicative signal as a tracking error signal.

The second signal processing circuit 30 has a fourth sample/hold circuit 15 which is connected to the timing control circuit 60. The sample/hold circuit 15 is also connected to the light receiving element 11 to receive therefrom the electric signal output therefrom. Similarly to the third sample/hold circuit 14, the fourth sample/hold circuit 15 is responsive to the timing control signal $T_3$ to be triggered to sample and hold the electric signal of the light receiving element 11. As triggered, the sample/hold circuit 15 samples and holds the electric signal of the light receiving element 11 at the timing of the timing control signal $T_3$.

The fourth sample/hold circuit 15 is connected to a comparator circuit 16 which compares the held value indicative output of the sample/hold circuit 15 with a zero level. In the shown embodiment, the comparator 16 comprises a differential amplifier having a non-inverting input terminal connected to the fourth sample/hold circuit 15 and an inverting input terminal connected to the ground.

The third sample/hold circuit 14 is connected to a tracking servo circuit 50 which comprises a low-pass filter 51, a phase compensation circuit 52, a switching circuit 53, a drive circuit 54 and a tracking coil 55. The tracking coil 55 is incorporated in an actuator for driving the object lens $L_1$ for tracking adjustment. The switching circuit 53 is also connected to a D flip-flop 18.

The third sample/hold circuit 14 is also connected to a zero-closing detector circuit 17 which detects zero-closing of the tracking error signal. The output of the zero-closing detector circuit 17 is connected to the D flip-flop 18. The D flip-flop is further connected to the comparator 16 to receive therefrom the comparator signal.

An RF signal reproduction circuit 70 is also provided in the preferred embodiment of the tracking servo system, according to the invention. The RF signal reproduction circuit 70 is designed to receive the output of the light-receiving element 11 and reproduces the RF signal.

Figure 1:
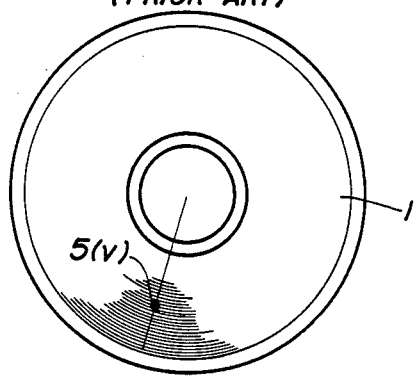
FIG. 1 is a general plan view of a recordable optical disk.
Figure 2:
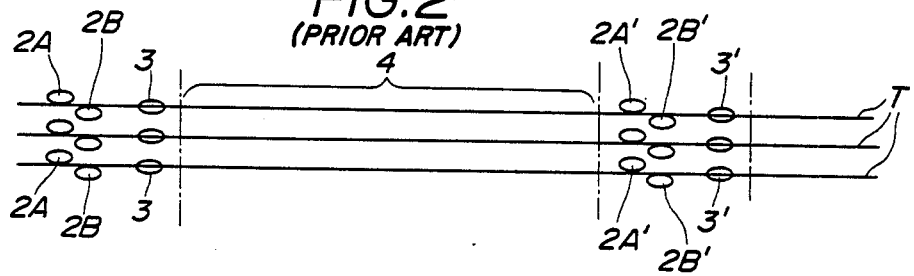
FIG. 2 is an enlarged illustration showing a structure of a recording track to be formed on the recordable optical disk.
Figure 3:
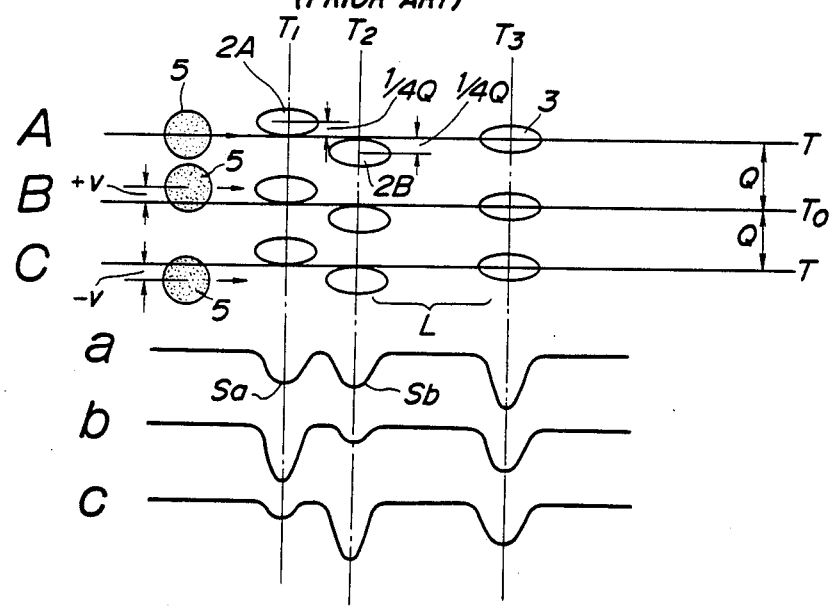
FIG. 3A-C, is a further enlarged illustration of pits in a servo area on the tracks of the recordable optical disk.

As set forth above, the output of the light receiving element 11 at the timing of the timing control signals $T_1$ and $T_2$ corresponds to the reflected light intensity from the servo pits 2A and 2B. Namely, since the servo pits 2A and 2B are formed as depressions on the track, the light intensity to be reflected at the servo pits 2A and 2B is lower than that reflected from the general surface of the optical disk. Similarly, the output of the light-receiving element 11 at the timing of the timing control signal $T_3$ is lowered depending upon the laser beam irradiating area of the clock pit 3. As will be appreciated herefrom and from FIG. 3 as discussed above, the value of the tracking error signal $e_t$ is variable depending upon the offset of the irradiating position v of the laser beam.

Namely, the value of the tracking error signal is a difference between the output signal value $E_a$ of the light receiving element 11 corresponding the light intensity $S_a$ reflected from the servo pit 2A and the output signal value $E_b$ of the light receiving element 11 corresponding to the light intensity $S_b$ reflected from the servo pit 2B. Therefore, the value of the tracking error signal $e_t$ can be illustrated by:

$$e_t = E_a - E_b \qquad (1)$$

Figure 4:
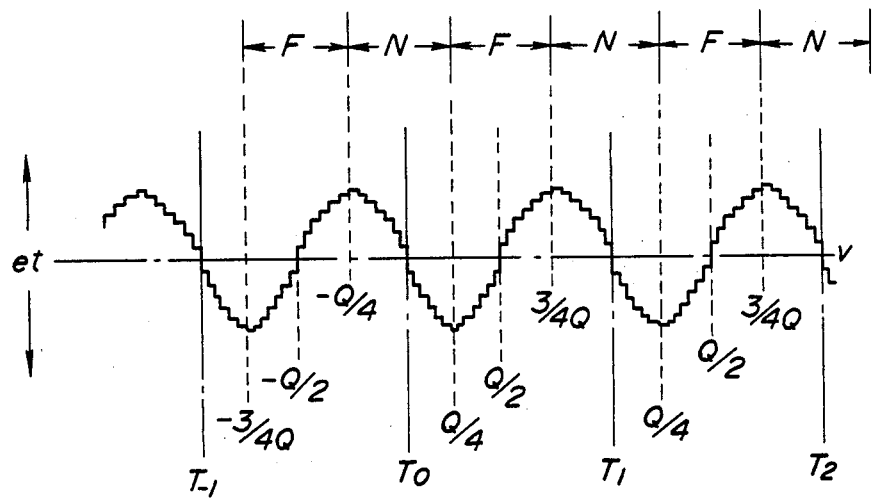
FIG. 4 is a chart showing waveform of a tracking error signal.

During radial shifting of the laser beam irradiating point, such as during traversing or track-jumping, the tracking error signal value $e_t$ varies according to radial shifting as shown in FIG. 4. Variation of the light receiver element output will be seen from FIG. 3 set forth above. Namely, assuming the laser beam irradiating point is v, the interval of the track centers is Q, and offset d of the servo pits 2A and 2B from the track center is Q/4. Further, assuming that the position v of the laser beam is zero at an on-track position relative to the recording track $T_0$, the light intensity reflected from the servo pit 2A becomes minimum at the laser beam irradiating point v=d. Similarly, the light intensity reflected from the servo pit 2A becomes minimum at the laser beam irradiating point v=−d. Therefore, the value $e_t$ of the tracking error signal can be illustrated by:

$$\begin{aligned} e_t &= \cos\{2\pi(v-d)/Q\} - -\cos\{2\pi(v+d)/Q\} \\ &= 2\sin(2\pi v/d)\sin 2\pi v/Q \\ &= -2\sin(2\pi v/Q) \end{aligned}$$

where $d = Q/4$.

Therefore, the tracking error signal having the value $e_t$ derived from the foregoing equations is output from the third sample/hold circuit 14. The waveform of the tracking error signal as output from the sample/hold circuit 14 is shown in FIG. 6, in which the waveform is illustrated in analog form for better understanding.

On the other hand, the sample/hold value $e_p$ in the fourth sample/hold circuit 15 becomes minimum when the laser beam irradiation point is an on-track condition, i.e. v=0. When the laser beam irradiating point resides at an intermediate portion between adjacent tracks, the sample/hold value $e_p$ of the fourth sample/hold circuit 15 becomes maximum. At the on-track condition of the laser beam, the sample/hold value $e_p$ of the fourth sample/hold circuit 15 can be illustrated by:

$$e_p = \cos(2\pi v/Q) + C$$

where C is a bias value.

Figure 6:
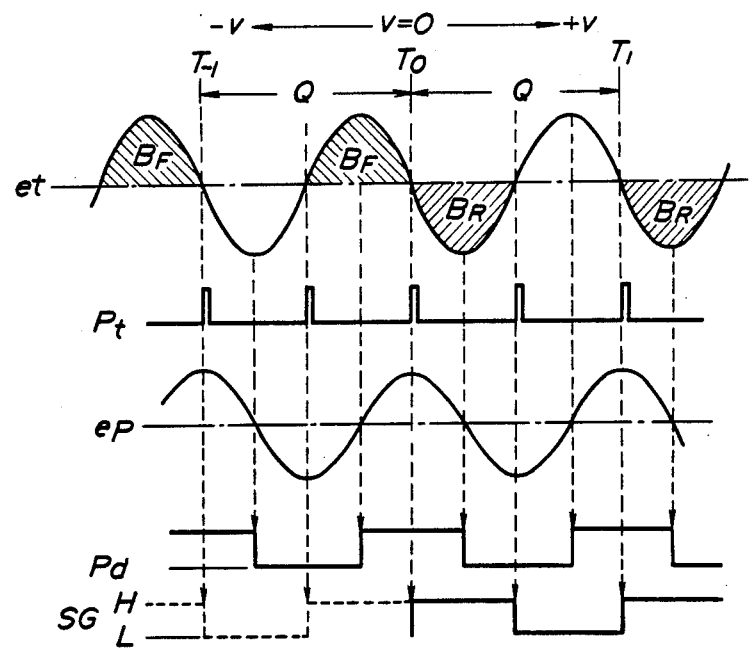
FIG. 6 is a chart showing waveforms of a tracking error signal and a polarity indicative signal.

Extracting AC component from the sample/hold value $e_p$, the sample/hold value $e_p$ of the fourth sample/hold circuit 15 can be illustrated in an analog waveform as shown in FIG. 6. As will be appreciated herefrom, the comparator signal contains a phase-shift relative to the tracking error signal at a magnitude of $\pi/2$.

As set forth, since the sample/hold value $e_p$ is compared with the zero level at the comparator 16, the compartor signal value $P_d$ varies between a HIGH level and a LOW level. Namely, the comparator signal $P_d$ is held at a HIGH level while the sample/hold value $e_p$ is greater than a zero level and is held at a LOW level while the sample/hold value $e_p$ is smaller than the zero level.

As set forth above, the comparator signal $P_d$ is input to the D flip-flop 18 via its D-terminal. On the other hand, the tracking error signal $e_t$ is input to the zero-closing detector circuit 17. The zero-closing detector circuit 17 detects the zero value of the tracking error signal $e_t$ to generate a trigger pulse $P_t$. This trigger signal $P_t$ of the zero-closing detector circuit 17 is input to the D flip-flop 18 to reverse the set/reset positions of the latter. Therefore, the output $S_G$ of the D flip-flop, as shown in FIG. 6, can be obtained.

As will be appreciated from FIG. 6, the polarity of the output signal $S_G$ of the D flip-flop 18 is varied depending upon the relative shift direction between the laser beam irradiating point v and the recording tracks on the optical disk D. Namely, the output signal $S_G$ is held at a HIGH level only in a period between the timings $t_1$ and $t_2$, in which the laser beam irradiating point v shifts across the track center, when the laser beam irradiating point shifts in a direction of $+v$. On the other hand, the output signal $S_G$ is held at a LOW level during a period between the timing $t_2$ and $t_3$, in which the irradiating point v of the laser beam shifts across the intermediate point between the adjacent tracks, when the laser beam irradiating point shifts in a direction of $+v$. On the other hand, when the irradiating point v of the laser beam shifts in a direction of $-v$, the output signal $S_G$ is held at a HIGH level only in a period between the timings $t_3$ and $t_2$, in which the laser beam irradiating point v shifts across the track center and is held at a LOW level during a period between the timing $t_2$ and $t_1$, in which the irradiating point v of the laser beam shifts across the intermediate point between the adjacent tracks.

The output signal $S_G$ of the D flip-flop 18 is fed to the switching circuit 53 of the tracking servo circuit 50 to open and close the latter. The switching circuit 53 is responsive to the HIGH level output signal $S_G$ of the D flip-flop 18 to close and is otherwise held open. Therefore, when the irradiating point of the laser beam shifts in a $+v$ direction, the tracking error signal in a hatched range $B_R$ is applied to the tracking coil to perform a CLOSED LOOP control to adjust the laser beam irradiating point a the track center $T_0$. On the other hand, when the irradiating point of the laser beam shifts in a $-v$ direction, the tracking error signal in a hatched range $B_F$ is applied to the tracking coil to perform a CLOSED LOOP control for decelerating the radial shift of the laser beam irradiating point.

By the foregoing operation, the period required for tracking adjustment after a traversing action or track-jump action can be substantially shortened.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

What is claimed is:

1. A tracking servo system for an optical disk player for reproducing and/or recording data on a plurality of coaxially formed recording tracks on an optical disk which has a pair of servo pits and a clock pit on each of said recording tracks, said pair of servo pits being arranged in a circumferentially spaced manner at a known distance and radially offset from a track center of the associated recording track so as to be placed at opposite sides of said track center at a known distance, comprising:

a laser beam generator means for irradiating a laser beam onto said optical disk for scanning the recording tracks;
   a laser beam driving means for causing a shift of an irradiating point of said laser beam in a radial direction;
   a tracking servo circuit means for controlling said laser beam driving means, said tracking servo circuit means being operable for operating said laser beam driving means to cause radial shifting of said laser beam irradiating point and operable in a feedback manner for adjusting said laser beam irradiating point on the center of said recording track;
   a light receiving means for receiving a light beam reflected from the laser beam irradiating point and producing a light intensity indicative signal;
   a first signal processing means for receiving said light intensity indicative signal respectively representative of the light intensity of the light beam reflected from respective servo pits for deriving a tracking error signal based on values of the light intensity indicative signal;
   a second signal processing means for receiving said light intensity indicative signal representative of the light intensity of the light beam reflected from said clock pit, detecting a shifting direction of the laser beam irradiating points in a radial direction, and the producing a state indicative signal indicative of the shifting state of said laser beam irradiating point shifting away from said track center and approaching said track center; and
   third signal processing means for receiving said track error signal to detect a zero-closing of said track error signal value for producing a zero-closing indicative signal and deriving a servo control signal for enabling and disabling said feedback mode tracking servo control of said tracking servo circuit means based on said state indicative signal and said zero-closing indicative signal.

2. A tracking servo system as set forth in claim 1, wherein said third signal processing means includes a D flip-flop having a D-terminal for receiving said state indicative signal and a clear-terminal for receiving said zero-closing indicative signal for outputting said servo control signal.

3. A tracking servo system as set forth in an claim 1, wherein said optical disk comprises an optomagnetic disk allowing writing in of data on said recording track in optomagnetical process.

4. A tracking servo system for an optical disk player for reproducing and/or recording data on a plurality of coaxially formed recording tracks on an optical disk which has first and second servo pits and a clock pit in each servo area of each of said recording tracks, said first and second servo pits being arranged at known positions in a circumferentially spaced manner at a known distance and radially offset from a track center of the associated recording track so as to be placed at opposite sides of said track center at a known distance, comprising:

a laser beam generator means for irradiating a laser beam onto said optical disk for scanning the recording tracks;

a laser beam driving means for causing a shift of an irradiating point of said laser beam in the radial direction;

a tracking servo circuit means, operable in a CLOSED LOOP mode and an OPEN LOOP mode, for controlling said laser beam driving means, said tracking servo circuit means being operable for operating said laser beam driving means to cause radial shifting of said laser beam irradiating point and to adjust said laser beam irradiating point on the center of said recording track in said CLOSED LOOP mode;

a tracking error signal generating means for deriving a tracking error signal on the basis of a difference of light intensity of a reflected light beam reflected from said first and second servo pits.

a shifting state detector means monitoring a relative position between the recording tracks and the laser beam irradiating point for discriminating a shifting state between a first state, in which said laser beam irradiating point shifts away from said track center, and a second state, in which said laser beam irradiating point approaches to said track center, and producing a state indicative signal; and a mode selector means for receiving said track error signal to detect a zero-closing of said track error signal value for producing a zero-closing indicative signal and deriving a mode selector signal for selectively operating said tracking servo circuit means in one of said CLOSED LOOP mode and said OPEN LOOP mode, based on said state indicative signal and said zero-closing indicative signal.

5. A tracking servo system as set forth in claim 4, wherein said state detector means detects light intensity of the reflected light beam reflected from said clock pit and discriminates said first and second states based on variation of the detected light intensity.

6. A tracking servo system as set forth in claim 5, wherein said state indicative signal to be produced by said state detector means is variable between a HIGH and a LOW level and is held at the HIGH level in said first state and at the LOW level in said second state.

7. A tracking servo system as set forth in claim 6, wherein said mode selector means is repsonsive to said zero-closing indicative signal to be reset and set at the level corresponding to the level of said state indicative signal.

8. A tracking servo system as set forth in claim 4, which further comprises a light receiving means for continuously receiving said reflected light beam and producing a light intensity indicative signal indicative of light intensity of said reflected light beam.

9. A tracking servo system as set forth in claim 8, wherein said tracking error signal generator means includes first means for sampling said light intensity indicative signal at a first known timing at which said laser beam is irradiated onto said first servo pit, a second means for sampling said light intensity indicative signal at a second known timing at which said laser beam is irradiated onto said second servo pit, and third means for deriving a difference between said light intensity indicative signals sampled by said first and second means for deriving said tracking error signal.

10. A tracking servo system as set forth in claim 9, wherein said state detector means includes fourth means for sampling said light intensity indicative signal at a third known timing at which said laser beam is irradiated onto said clock pit to produce a signal having a phase shift relative to said tracking error signal in a known magnitude.

11. A tracking servo system as set forth in claim 10, wherein said magnitude of phase shift of said signal produced by said fourth means is $\pi/2$.

12. A tracking servo system as set forth in claim 4, which is adopted to be applicable for an optical disk having a data area writable and readable of data on said recording track.

13. A tracking servo system as set forth in claim 12, wherein said optical disk comprises an optomagnetic disk.

* * * * *